(12) United States Patent
Herrmann et al.

(10) Patent No.: US 6,834,594 B2
(45) Date of Patent: Dec. 28, 2004

(54) TUBULAR GAS GENERATOR

(75) Inventors: Günter Herrmann, Feldkirchen (DE); Rolf Ruckdeschel, Schwangau (DE)

(73) Assignee: TRW Airbag Systems GmbH & Co. KG, Aschau Inn (DE)

( * ) Notice: Subject to any disclaimer, the term of this patent is extended or adjusted under 35 U.S.C. 154(b) by 0 days.

(21) Appl. No.: 10/440,671

(22) Filed: May 19, 2003

(65) Prior Publication Data

US 2003/0217666 A1 Nov. 27, 2003

(30) Foreign Application Priority Data

May 21, 2002 (DE) .......................................... 202 07 861

(51) Int. Cl.[7] ................................................. C06D 5/00
(52) U.S. Cl. ..................... 102/530; 102/531; 102/275.1; 102/275.9
(58) Field of Search ................................ 102/530–531, 102/275.1, 275.9

(56) References Cited

U.S. PATENT DOCUMENTS

| 3,194,851 | A | * | 7/1965 | Sauer et al. | |
|---|---|---|---|---|---|
| 3,794,535 | A | * | 2/1974 | Bertrand et al. | |
| 5,299,828 | A | | 4/1994 | Nakajima et al. | |
| 5,345,873 | A | * | 9/1994 | Lauritzen et al. | |
| 5,427,030 | A | * | 6/1995 | Kidd et al. | 102/530 |
| 5,507,890 | A | * | 4/1996 | Swann et al. | |
| 5,533,754 | A | | 7/1996 | Riley | |
| 5,551,343 | A | * | 9/1996 | Hock et al. | |
| 2002/0189481 | A1 | * | 12/2002 | Smith et al. | 102/275.1 |

FOREIGN PATENT DOCUMENTS

| DE | 3932576 A1 | 4/1991 |
|---|---|---|
| DE | 19731221 A1 | 1/1999 |
| DE | 10009417 A1 | 9/2001 |
| EP | 0995645 A2 | 4/2000 |
| EP | 0995645 A2 | 4/2000 |
| FR | 1118847 | 12/1956 |
| GB | 807499 | 1/1959 |

* cited by examiner

*Primary Examiner*—Jack Keith
*Assistant Examiner*—L. Semunegus
(74) *Attorney, Agent, or Firm*—Tarolli, Sundheim, Covell & Tummino L.L.P.

(57) ABSTRACT

A gas generator comprises a tubular housing of a pressure-resistant material and a propellant strand which is incorporated in the housing and provided with an envelope. At least one channel is provided between the envelope and the propellant strand so as to extend in an axial direction. The propellant strand has a substantially circular cross-section and the envelope has a polygonal cross-section.

13 Claims, 1 Drawing Sheet

TUBULAR GAS GENERATOR

TECHNICAL FIELD

This invention relates to a gas generator for use in a vehicle occupant restraint system.

BACKGROUND OF THE INVENTION

Gas generators are known in the art which comprise a tubular housing of a pressure-resistant material and a propellant strand incorporated in the housing, at least one channel being provided between the envelope and the propellant strand so as to extend in an axial direction.

Such tubular gas generator is already known from DE-A1 100 09 417. In the known gas generator, the axially extending channels are formed by a propellant charge which has a central bore and is cross-shaped in cross-section, the propellant charge being surrounded by a shrinkable tube. For insulation purposes, the shrinkable tube may also be disposed on the outside of the tubular housing.

EP 0 995 645 A2 describes a tubular gas generator, in which a propellant strand provided with radially extending extensions is inserted in a tubular housing of pressure-resistant material, the radial extensions resting against the inner wall of the housing. Due to the special geometry of the propellant strand channels are thus formed, which extend in axial direction between the respective radial extensions so as to pass on the pressure wave generated by the igniter. To ensure a rather complete deflagration of the solid propellant, the bores incorporated in the housing are at least partly insulated.

DE-A1 39 32 576 describes a gas-generating means for a gas generator for ejecting ammunition or for filling air bags, which has a slowly burning solid propellant in the form of a tube or strand and an explosive coating resting against a longitudinal side of the solid propellant. The solid propellant can have a hollow cylindrical shape, so that inside the propellant strand an axially extending channel is formed. The explosive coating then likewise lies inside this channel. Alternatively, it is suggested to provide the solid propellant with an envelope. In this case, the cross-section of the solid propellant is star-shaped.

The tubular gas generators provided for use in vehicle occupant restraint systems must have reaction times within the range of few milliseconds. To this end, a deflagration of propellant must be ensured, which takes place completely and in the shortest time possible. It must therefore be ensured that the propellant is ignited rather simultaneously over the entire length of the gas generator. Ignition is mostly effected via a gas pressure wave generated by an ignition element, which propagates along the channels extending in axial direction in the tubular gas generator. To compensate energy losses of the pressure wave and to ensure a uniform ignition, the propellant usually is also provided with an explosive coating, which is activated by the pressure wave.

In a tubular gas generator, i.e. a gas generator with a ratio of length to diameter (aspect ratio) of larger than 10, preferably larger than 50, channels usually extending in axial direction are formed due to this special ignition mechanism. For forming these channels, complicated propellant geometries had to be used so far. Since the stability of the propellant geometry must be ensured during the lifespan of the vehicle, it is not possible to employ any kind of pyrotechnical propellant charges. In EP 0 995 645 A2, for instance, the use of a fiber-reinforced pyrotechnical propellant is regarded as advantageous. The embodiment of a hollow cylindrical propellant strand with internal explosive coating, which is described in DE 39 32 576 A1, is difficult to realize in technical terms and leads to insufficient deflagration properties.

In comparison with that, the invention provides a tubular gas generator of a simple structure and inexpensive to produce, for the production of which known techniques can be used.

BRIEF SUMMARY OF THE INVENTION

According to the invention, a gas generator comprises a tubular housing of a pressure-resistant material and a propellant strand which is incorporated in the housing and provided with an envelope. At least one channel is provided between the envelope and the propellant strand so as to extend in an axial direction. The propellant strand has a substantially circular (i.e. round) cross-section and the envelope has a polygonal cross-section.

For the purposes of the invention, propellant strands of substantially circular or round cross-section are meant to include those cylindrical propellant strands which in contrast to the circular shape are oval or flattened on their longitudinal side.

Providing a substantially circular propellant strand provides for using known extrusion methods as they are commonly used for instance in the production of single- and multi-hole powders. Thus, all extrudable propellants can be used as well. On the other hand, the production of dimensionally stable envelopes with more complex, polygonal cross-sections is possible without any major technical effort, for instance, be extruding suitable materials. By fitting a substantially circular cylindrical propellant strand into a polygonal, preferably triangular or tetragonal envelope, there is also ensured the formation of the axially extending channels for passing on the gas pressure wave generated by the igniter. On the other hand, the dimensional stability of the propellant strand and of the envelope distinctly reduces the risk of breakage of the strand and hence the risk of failure of the ignition mechanism.

To increase the compressive strength, the tubular housing may comprise a plurality of layers. Preferably, the housing has an inner layer as well as an outer layer of plastics as well as a middle layer of aluminum, which is connected with the inner layer and the outer layer via adhesion-promoting intermediate layers. Such layered structure ensures a particular compressive strength and flexibility at the same time. Another possibility consists in providing a two-layer housing with an outer plastic layer and an inner aluminum layer. In this case, the aluminum layer may constitute a thin metal film with a layer thickness of less than 0.1 mm, preferably between 0.08 and 0.1 mm, and perform the function of an insulation. The aluminum film will then also seal the bores incorporated in the housing.

The multilayer housing can be produced by coextruding the above-mentioned materials. The ratio of length to diameter of the housing is at least 10, preferably at least 50, and particularly preferably at least 100.

The propellant strand preferably has a cross-section in the form of a circular ring, i.e. the strand constitutes a hollow cylinder. The production of such hollow cylindrical solid propellants by extrusion is known already and possible without any technical difficulties. For producing the propellant strand, known pyrotechnical solid propellants can be used, as they are described for instance in EP-A2 995 645. There may be used the composite propellants which are known from DE-A1 44 46 976 and comprise a thermoplastic binder, possibly a plasticizer and an oxidizer. The use of these composite propellants is advantageous due to their higher elasticity. For the purposes of the invention, the propellant strand can furthermore be divided in segments which may preferably have a length of about 3 to 10 cm.

On at least one of its surfaces adjoining the axially extending channels between the envelope and the propellant strand, the propellant strand may be provided with a coating of an ignition mixture. As ignition mixture, an aluminized mixture of boron and potassium nitrate can be used, for instance. The ignition mixture is activated by the gas pressure wave generated by the igniter and ensures a complete ignition of the propellant strand over the entire length of the tubular gas generator. Preferably, however, the propellant itself can sufficiently be activated by the pressure wave.

The envelope surrounding the propellant strand has at least one layer of an extrudable material. This material may for instance be selected from brass, aluminum, plastics or paper. The envelope is dimensionally stable under ambient conditions. Under the influence of pressure, it can expand, however, and rest against bores incorporated in the housing of the tubular gas generator. In the case of the activation of the gas generator, this will first of all lead to an increase in pressure in the interior of the housing and thus to a faster and complete deflagration of propellant. When a predetermined internal pressure is exceeded, the envelope will burst at the bores and the gases released by the propellant can escape from the tubular gas generator and activate the vehicle occupant restraint means, for instance an inflatable gas bag or a knee protector.

The cross-section of the envelope preferably is a regular polygon, particularly preferably triangular or square, so that the substantially circular propellant strand can easily be inserted in the envelope by forming rather small contact surfaces and rather large gas channels. The envelope may in addition be provided with a moisture-proof coating, in order to protect the propellant against environmental influences and ensure the functional reliability over the entire lifespan of the motor vehicle.

In general, the diameter of the substantially circular propellant strand should advantageously correspond approximately to the smallest inside diameter of the envelope. As a result, the propellant strand can be supported on the inner surfaces of the envelope by forming small contact surfaces. Thus, the occurrence of rattling noise is avoided and the dimensional stability of the propellant strand is increased. Analogously, the largest diameter of the envelope approximately corresponds to the smallest inside diameter of the tubular housing, which in this case should likewise have an approximately ring-shaped cross-section. In this way, the envelope can safely be fixed inside the housing without restricting the flexibility of the tubular gas generator.

The invention thus provides a tubular gas generator of a simple structure, for the production of which known technical means can be used and which is therefore inexpensive to produce.

DETAILED DESCRIPTION OF THE PREFERRED EMBODIMENT

Figure 1:
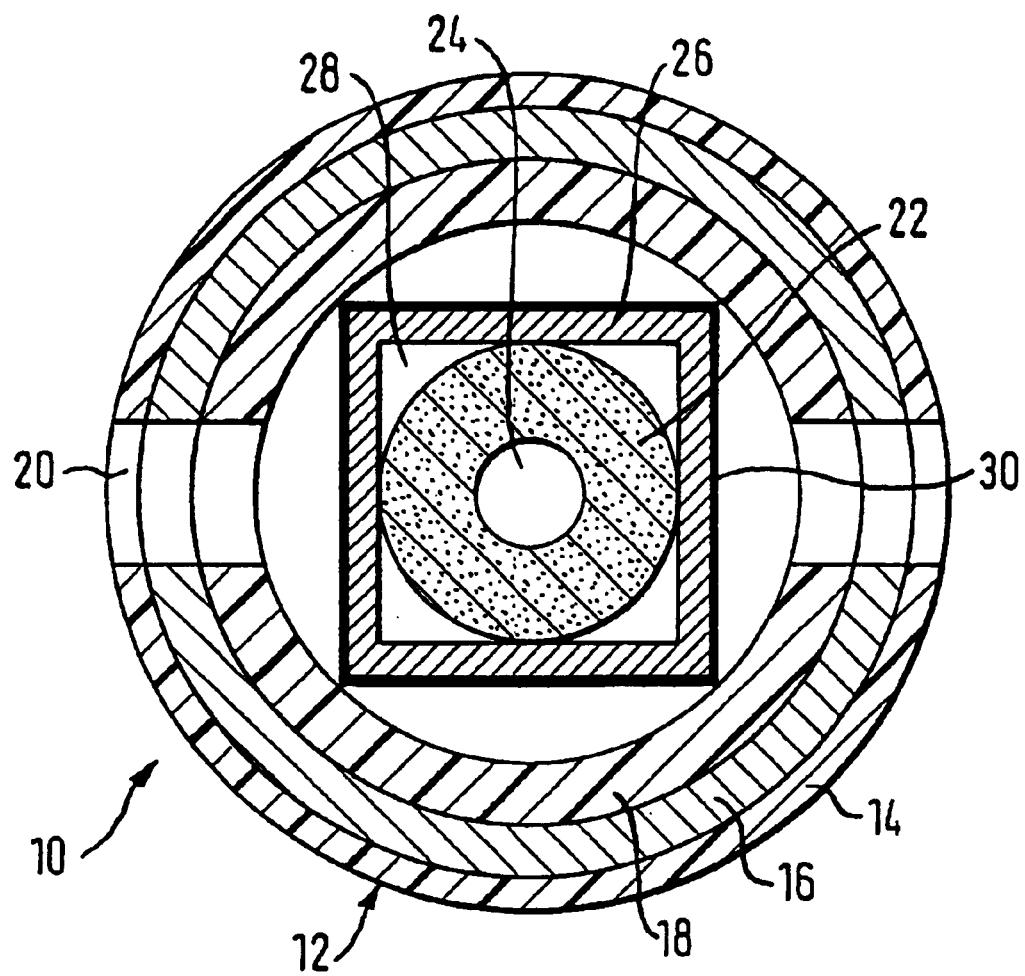
FIG. 1 shows a cross-section through a tubular gas generator in accordance with the invention.

In the preferred embodiment represented in FIG. 1, the tubular gas generator 10 has a tubular housing 12 of a pressure-resistant material, which here comprises three layers 14, 16, 18. The outer layer 14 and the inner layer 18 are formed of an extrudable plastic material. The middle layer 16 connected with the outer layer 14 and the inner layer 18 preferably is made of aluminum. The housing 12 has been made by coextrusion of the layers 14, 16 and 18, and for a better connection of the layers an adhesion promoter may be used.

In the housing 12, bores 20 are incorporated for the discharge of gas. On their inside, the bores may be provided with an insulation or membrane (not shown). On one of the end faces of the housing 12, a conventional ignition element (not shown) is disposed.

In the housing 12, a cylindrical propellant strand 22 is incorporated. In the embodiment represented here, the propellant strand has a cross-section in the form of a circular ring, i.e. the strand has a central bore 24.

The circular cylindrical, to be more precise hollow circular cylindrical, propellant strand 22 furthermore is surrounded by an envelope 26, which here is square. The envelope can be made for instance by extruding brass, aluminum, plastics or also paper. As an alternative to the embodiment shown here, the envelope can also have a triangular or polygonal cross-section, particularly preferably in the shape of a regular polygon. Due to the different cross-sectional areas, channels 28 extending in axial direction between the envelope and the propellant strand are formed in the corners of the polygon, in the embodiment shown here in the corners of the envelope which is square in cross-section. These channels 28 serve to pass on the gas pressure wave generated by an ignition element (not shown) in the case of the activation of the gas generator.

The corners of the envelope 26 are also supported on the inside of the housing 12, so that the envelope and the propellant strand are safely fixed inside the housing 12.

If the envelope is formed of a brittle plastic material or paper, it may be coated with a moisture-proof layer 30 on its outside. Thus, the operativeness of the propellant is maintained over the lifespan of the motor vehicle.

By using a substantially ring-shaped cross-section for the propellant strand and a cross-section in the shape of a regular polygon for the envelope, the diameter of the propellant strand substantially corresponding to the smallest inside diameter of the regular polygon, extremely small contact surfaces are obtained between envelope and propellant strand, so that the strand can be inserted in the envelope easily and without a risk of breakage. Thus, the strand is safely fixed inside the envelope. The occurrence of rattling noise is also avoided. Furthermore, the propellant strand may in this case also consist of segments having a length of about 3 to 10 cm.

The cross-sectional areas of envelope and propellant strand are adjusted to each other such that the channels formed in the corners of the polygon have a sufficiently large volume for passing on the gas pressure wave. On the surfaces adjoining the channels 28, the propellant strand can additionally be coated with an ignition mixture, in order to compensate the energy losses obtained when passing on the gas pressure wave.

As soon as a sensor disposed in the vehicle detects a vehicle accident, the ignition element disposed on an end face of the gas generator 10 is activated via an electric signal. This ignition element generates a gas pressure wave, which ignites the propellant strand 22 everywhere on its surface within the necessary short range of milliseconds. The pressure generated upon ignition of the propellant strand either leads to a bursting of the envelope or deforms the envelope 26 such that it rests against the inside of the housing 12 and in the case of a continuing increase in pressure bursts in the region of the bores 20. As a result, an equilibrium pressure is obtained between the amount of gas generated by the deflagration of the propellant strand 22 and the gas volume escaping through the bores 20. Within the required reaction time of few milliseconds, the escaping gases then activate a safety means, for instance an inflatable gas bag, a splinter protection or a knee protector.

What is claimed is:

1. A gas generator adapted for use in a vehicle occupant restraint system comprising a tubular housing of a pressure-resistant material and a propellant strand which is incorporated in said housing and provided with an envelope, at least one channel being provided between said envelope and said propellant strand so as to extend in an axial direction, the improvement consisting in that said propellant strand has a substantially circular cross-section and said envelope has a polygonal cross-section, wherein a largest diameter of said envelope corresponds approximately to a smallest inside diameter of said tubular housing.

2. The gas generator as claimed in claim 1, wherein said tubular housing is made up of a plurality of layers.

3. The gas generator as claimed in claim 1, wherein said housing has an inner layer as well as an outer layer of plastics as well as a middle layer of aluminum connected with said inner and outer layers.

4. The gas generator as claimed in claim 1, wherein said housing has an outer layer of plastics and an inner layer of aluminum.

5. The gas generator as claimed in claim 1, wherein said propellant strand has a cross-section in the form of a circular ring.

6. The gas generator as claimed in claim 1, wherein said propellant strand has a surface area where it is at least partially provided with a coating made of an ignition mixture.

7. The gas generator as claimed in claim 6, wherein said ignition mixture is an aluminized mixture of boron and potassium nitrate.

8. The gas generator as claimed in claim 1, wherein said envelope has at least one layer made of an extrudable material.

9. The gas generator as claimed in claim 8, wherein said extrudable material is selected from the group comprising brass, aluminum, plastics and paper.

10. The gas generator as claimed in claim 1, wherein said housing is provided with bores, and said envelope is expandable under the influence of pressure and rests against said bores in said housing.

11. The gas generator as claimed in claim 1, wherein a cross-section of said envelope is one of triangular or square.

12. The gas generator as claimed in claim 1, wherein said envelope is provided with a moisture-proof coating.

13. The gas generator as claimed in claim 1, wherein a diameter of said propellant strand corresponds approximately to a smallest inside diameter of said envelope.

* * * * *

UNITED STATES PATENT AND TRADEMARK OFFICE
CERTIFICATE OF CORRECTION

PATENT NO. : 6,834,594 B2 Page 1 of 1
APPLICATION NO. : 10/440671
DATED : December 28, 2004
INVENTOR(S) : Günter Herrmann and Rolf Ruckdeschel It is certified that error appears in the above-identified patent and that said Letters Patent is hereby corrected as shown below:

Title Page (73) Assignee, Delete "TRW Airbag Systems GmbH & Co. KG" and insert --TRW Airbag Systems GmbH--.

Signed and Sealed this

Fourth Day of November, 2008

JON W. DUDAS
*Director of the United States Patent and Trademark Office*